(12) United States Patent
Wolff

(10) Patent No.: US 12,066,410 B2
(45) Date of Patent: Aug. 20, 2024

(54) FASTENING ARRANGEMENT FOR FASTENING A SAMPLE HOLDER TO A FORCE MEASUREMENT DEVICE, SAMPLE HOLDER AND COUNTERPART HOLDER FOR A FASTENING ARRANGEMENT OF SAID TYPE, AND FORCE MEASUREMENT DEVICE HAVING A FASTENING ARRANGEMENT OF SAID TYPE

(71) Applicant: Vetter Pharma-Fertigung GmbH & Co. KG, Ravensburg (DE)

(72) Inventor: Michael Wolff, Gestratz (DE)

(73) Assignee: Vetter Pharma-Fertigung GmbH & Co. KG, Ravensburg (DE)

( * ) Notice: Subject to any disclaimer, the term of this patent is extended or adjusted under 35 U.S.C. 154(b) by 415 days.

(21) Appl. No.: 17/312,285

(22) PCT Filed: Dec. 6, 2019

(86) PCT No.: PCT/EP2019/083946
§ 371 (c)(1),
(2) Date: Jun. 9, 2021

(87) PCT Pub. No.: WO2020/120304
PCT Pub. Date: Jun. 18, 2020

(65) Prior Publication Data
US 2022/0107249 A1   Apr. 7, 2022

(30) Foreign Application Priority Data

Dec. 10, 2018 (DE) .................... 10 2018 221 334.8

(51) Int. Cl.
*G01N 3/04* (2006.01)
*G01N 3/08* (2006.01)

(52) U.S. Cl.
CPC ............... *G01N 3/04* (2013.01); *G01N 3/08* (2013.01); *G01N 2203/04* (2013.01); *G01N 2203/0447* (2013.01)

(58) Field of Classification Search
CPC ........ G01N 3/04; G01N 3/08; G01N 2203/04; G01N 2203/0447; G01M 99/007;
(Continued)

(56) References Cited

U.S. PATENT DOCUMENTS

| 2014/0112699 A1* | 4/2014 | Lewkoski ............... F16L 39/04 403/33 |
| 2016/0161380 A1* | 6/2016 | Komine ................... G01N 3/04 73/826 |

FOREIGN PATENT DOCUMENTS

| DE | 265536 A3 | 3/1989 | |
| DE | 20106760 U1 * | 7/2001 | ............... G01N 3/04 |

(Continued)

OTHER PUBLICATIONS

International Search Report and Written Opinion for PCT/EP2019/083946 dated Apr. 8, 2020, 13 pages.

*Primary Examiner* — Eric S. McCall
*Assistant Examiner* — Timothy P Graves
(74) *Attorney, Agent, or Firm* — Sheppard Mullin Richter & Hampton LLP

(57) ABSTRACT

A fastening arrangement fastens a sample holder to a force measuring device. The fastening arrangement has a sample holder, a counterpart holder on the side of the force measuring device. The counterpart holder has a sample holder receptable. The sample holder has a planar abutment surface and the sample holder receptacle has a flat counterpart abutment surface. The sample holder has a positioning element and a fixing element. The sample holder receptacle has a counterpart positioning element and a counterpart fixing element. The positioning element and the counterpart
(Continued)

positioning element uniquely define a relative position between the sample holder and the counterpart holder together with the abutment surface and the counterpart abutment surface. The fixing element and the counterpart fixing element hold the sample holder and the counterpart holder against one another and force the abutment surface and the counterpart abutment surface against one another.

14 Claims, 4 Drawing Sheets

(58) Field of Classification Search
CPC .............. G01M 99/00; B01L 2200/025; B01L 2300/0803; B01L 2400/0409; B01L 3/502715; B01L 3/502761; B25B 11/02; F16B 2/02

See application file for complete search history.

(56) References Cited

FOREIGN PATENT DOCUMENTS

| | | | | |
|---|---|---|---|---|
| DE | 20106760 U1 | 7/2001 | | |
| DE | 102006022711 A1 | 11/2007 | | |
| KR | 20080039087 A | * | 5/2008 | .............. G01N 3/02 |
| KR | 20080039087 A | | 5/2008 | |
| RU | 1796968 A1 | 2/1993 | | |

* cited by examiner

FASTENING ARRANGEMENT FOR FASTENING A SAMPLE HOLDER TO A FORCE MEASUREMENT DEVICE, SAMPLE HOLDER AND COUNTERPART HOLDER FOR A FASTENING ARRANGEMENT OF SAID TYPE, AND FORCE MEASUREMENT DEVICE HAVING A FASTENING ARRANGEMENT OF SAID TYPE

CROSS-REFERENCE TO RELATED APPLICATIONS

This application is a U.S. National Stage Application under 35 U.S.C. § 371 of International Application No. PCT/EP2019/083946, filed Dec. 6, 2019, which claims priority to DE 10 2018 221 334.8, filed Dec. 10, 2018, the contents of which are incorporated to the present disclosure by reference.

The invention relates to a fastening arrangement for fastening a sample holder to a force measuring device, a force measuring device with a fastening arrangement of said type, as well as a sample holder and a counterpart holder for a fastening arrangement of said type.

Force measuring devices of the type discussed here are used, in particular, to carry out tensile and compression tests, in particular, on medical hollow bodies. By means of such force measuring devices, for example, a sliding force and/or tightness of a displaceable piston in a medical hollow body can be determined, in particular, on the basis of the compressive force required to displace the piston. In particular, it is possible to verify whether a sufficient, or possibly excessive, amount of silicone or another lubricant has been applied. Furthermore, stability, assembly force, breaking force, torsional resistance and other properties, especially in the case of medical hollow bodies, can be tested. Such a force measuring device typically has a base body, in particular with a base plate, and a force measuring tower arranged on the base body, in particular on the base plate, wherein a sample holder can be arranged in a fixed position on the base body, in particular on the base plate, and wherein a test element can be arranged on a slide that is displaceable along the height of the force measuring tower. For a force measurement, in particular tensile/compressive force measurement, the test device holder, with the at least one test device, is displaced on the slide relative to a sample holder and in particular relative to a sample arranged on the sample holder along the vertical direction of the force measuring tower, or at least is loaded with a force in the direction of displacement—either in the direction of tension or compression. The force is recorded—in particular, as a function of time. Information about the sample can then be obtained from a force profile over time and/or a force profile plotted over a displacement path of the slide.

In order to obtain reproducible and relevant results, it is necessary that the sample and the slide displacement path, in particular, the vertical direction of the force measuring tower, are aligned exactly parallel to each other. In particular, there must be neither a parallel offset nor an angular offset between the test element and the sample if the measurement results are to be meaningful.

Current, commercially available sample holders and fastenings for these are neither specifically designed for medical hollow bodies nor are they able to ensure their orientation relative to the vertical axis of the force measuring tower in a highly precise and reproducible manner. This is especially true when the samples or the sample holder is exchanged. Because of their elongated design, especially syringes or carpules require a particularly high level of accuracy, with which their longitudinal axis must be aligned parallel to the vertical direction of the force measuring tower. This is all the more true when a plurality of samples is to be tested next to one another on the same force measuring device.

Furthermore, there is a need in the field of medical hollow bodies to be able to test different hollow bodies with a force measuring device, and in the context of which a switch between different types of medical hollow body, but also a switch between different samples of the same hollow body should be quick, easy and nevertheless provide a high degree of accuracy. At the same time, it should be possible to standardize such an arrangement.

The invention is therefore based on the object of creating a fastening arrangement for fastening a sample holder to a force measuring device, a force measuring device with a fastening arrangement of said type, as well as a sample holder and a counterpart holder for a fastening arrangement of said type, in which the disadvantages mentioned do not occur.

The object is achieved by creating the subject matter of the independent claims. Advantageous configurations are found in the dependent claims.

The object is achieved, in particular, by creating a fastening arrangement for fastening a sample holder to a force measuring device that has a sample holder and a counterpart holder on the side of the force measuring device. The counterpart holder is formed or arranged on the force measuring device, or it may be firmly connectable to the force measuring device. Furthermore, the counterpart holder has at least one sample holder receptacle. The sample holder has a planar abutment surface. The sample holder receptacle has a planar counterpart abutment surface. In particular, the planar abutment surface and the planar counterpart abutment surface are configured for a planar contact with one another, in particular for a full contact with one another, and are, in particular, coordinated with one another. The sample holder further has at least one positioning element and one fixing element, while the sample holder receptacle has at least one counterpart positioning element and one counterpart fixing element. The positioning element and the counterpart positioning element are configured and matched to one another to uniquely define a relative position between the sample holder and the counterpart holder together with the abutment surface and the counterpart abutment surface, in particular when the abutment surface rests on the counterpart abutment surface. The fixing element and the counterpart fixing element are configured and, in particular, matched to one another in order to hold the sample holder and the counterpart holder against one another and to force the abutment surface and the counterpart abutment surface against one another. This way, a highly precise, reproducible and quickly releasable and lockable connection can be created between the sample holder to the counterpart holder. In particular, a relative position of a sample held on the sample holder relative to the counterpart holder on the side of the force measuring device and thus also relative to the force measuring device, in particular relative to a vertical axis of a force measuring tower of the force measuring device, is achieved by the abutment of the abutment surface on the counterpart abutment surface on the one hand and the interaction of the positioning element with the counterpart positioning element on the other. Since the fixing element and the counterpart fixing element hold the sample holder and the counterpart holder against one another, their relative position to one another is fixed.

The abutment surface and the counterpart abutment surface are designed, in particular, to correspond to one another and/or complement one another so that they can be in full contact with one another.

The positioning element and the counterpart positioning element are preferably matched to one another in such a way that they correspond to one another and are designed to be complementary to one another.

The fixing element and the counterpart fixing element are preferably matched to one another in such a way that they correspond to one another. In particular, the fixing element and the counterpart fixing element are preferably designed to be complementary to one another.

The fixing element and the counterpart fixing element are designed, in particular, to firmly press the abutment surface and the counterpart abutment surface against one another, in particular without a gap so that they are in full contact with one another.

The fixing element and the counterpart fixing element are designed, in particular, to hold the sample holder and the counterpart holder in the uniquely defined relative position.

A relative position is understood here to mean, in particular, a three-dimensional position in space which the sample holder and the counterpart holder assume relative to one another. In particular, a uniquely defined relative position is understood to refer to a relative position in space in which all degrees of freedom of movement are defined such that neither a translational nor a rotational relative movement is possible between the counterpart holder and the sample holder. Rather, their relative position to one another in space is uniquely defined.

In particular, the planar, preferably full contact of the abutment surface and the counterpart abutment surface defines one degree of freedom of translation, in particular perpendicular to the abutment surface and the counterpart abutment surface, and two degrees of freedom of rotation. The interaction of the positioning element with the counterpart positioning element preferably defines the remaining degree of freedom of rotation and the two remaining degrees of freedom of translation.

The fixing element and the counterpart fixing element are preferably not used—at least not primarily—to define a degree of freedom, but rather to fix or lock the arrangement of the sample holder and the counterpart holder in the defined relative position. The functional separation between the definition of the relative position by means of the abutment surface, the counterpart abutment surface, the at least one positioning element and the at least one counterpart positioning element on the one hand, and the fixing/locking by means of the fixing element and the counterpart fixing element on the other hand, allows for a particularly precise and reproducible determination of the relative position, which at the same time guarantees an easy releasability and lockability of the sample holder on the counterpart holder and thus a quick interchangeability of different sample holders.

The counterpart holder is preferably firmly, in particular in a fixed position, particularly preferably permanently, connected to the force measuring device. In particular, the counterpart holder is preferably firmly, in particular in a fixed position, preferably permanently, connected to the base body, and arranged on the base plate. Thus, in particular, a relative position between the counterpart holder and the force measuring tower is defined and precisely specified, with the sample holder in turn being able to be arranged precisely and reproducibly on the counterpart holder in such a way that its position relative to the force measuring tower can be reproducible and defined with a high degree of accuracy as well.

A sample holder is understood here to refer to both a holder that is configured to hold a sample in the narrower sense, for example a medical hollow body, but on the other hand the sample holder can also be a calibration device or a holder for a calibration device, with the calibration device being configured to calibrate the force measuring device. Such a calibration device can then be arranged on the counterpart holder in a reproducible and simple manner instead of a sample such that a reproducible, simple and fast calibration of the force measuring device is possible.

The sample holder and the counterpart holder are particularly preferably matched to one another, and, in particular, the planar abutment surface and the planar counterpart abutment surface, the at least one positioning element and the at least one counterpart positioning element, as well as the fixing element and the counterpart fixing element, are matched to one another in such a way that the sample holder with the counterpart holder can be connected, by means of a simple movement, in one direction, in particular therefore by means of a one-dimensional movement. In particular, a simple, one-dimensional movement allows for the sample holder to be latched to or clipped onto the counterpart holder so that the fixing element and the counterpart fixing element engage or lock with one another in order to hold the sample holder on the counterpart holder. The sample holder can also be released from the counterpart holder preferably by means of a simple, in particular one-dimensional movement. This allows for a particularly quick arrangement of the sample holder on the counterpart holder and a quick removal of the sample holder from the counterpart holder so that, in particular, different samples and/or calibration devices can be arranged, and therefore exchanged on the counterpart holder one after the other.

According to a further development of the invention, it is provided that the at least one positioning element is a fitting pin, and the at least one counterpart positioning element is a fitting bore. This way, the positioning element designed as a fitting pin can engage in the counterpart positioning element designed as a fitting bore. Likewise, a reverse configuration is possible, in which case the positioning element is designed as a fitting bore, and the counterpart positioning element is designed as a fitting pin. Since the fitting pin engages in the fitting bore, two degrees of freedom of translation can be specified perpendicular to the direction in which the fitting pin is inserted into the fitting bore. The positioning element and the counterpart positioning element are preferably arranged on the sample holder or the counterpart holder in an eccentric manner—particularly relative to the fixing element and/or the counterpart fixing element—such that a degree of freedom of rotation can also be established by engaging the fitting pin in the fitting bore.

According to a further development of the invention, it is provided that the sample holder, as the at least one positioning element, has a first positioning element and a second positioning element. The sample holder receptacle, as the at least one counterpart positioning element, furthermore has a first counterpart positioning element and a second counterpart positioning element. According to one embodiment, the first positioning element is preferably designed as a round pin, and the second positioning element as a flat pin or diamond-shaped pin. In this case, both counterpart positioning elements are preferably designed as fitting bores, which are configured, in particular, in such a way that the positioning element assigned to them can accurately engage in the respective fitting bore. It is also possible that the first counterpart positioning element is designed as a round pin, and the second counterpart positioning element as a diamond-shaped pin or as a flat pin; accordingly, the positioning elements are then preferably each designed as corresponding fitting bores. However, it is also possible that one of the two positioning elements is designed as a round pin, or as a diamond-shaped or flat pin, while the other of the positioning elements is designed as a fitting bore. Correspondingly, one of the counterpart positioning elements is then designed as a fitting bore, with the other of the counterpart positioning elements being designed as a diamond-shaped pin or flat pin, or as a round pin, depending on how the corresponding positioning element is designed: If the corresponding positioning element is designed as a round pin, the counterpart positioning element is designed as a flat or diamond-shaped pin; conversely, if the positioning element is designed as a diamond-shaped or flat pin, the corresponding counterpart positioning element is designed as a round pin. In any case, a round pin engaging in a first fitting bore and a flat pin or diamond-shaped pin engaging in a second fitting bore are combined with one another in order to establish the relative position between the sample holder and the counterpart holder.

A round pin is understood to refer to a pin that has a circular cylindrical shaft. It is possible for the round pin to have a conical or beveled insertion portion for an easier insertion into the fitting bore. A diamond-shaped or flat pin is understood to refer to a pin whose extension is greater along a first direction perpendicular to the insertion direction than along a second direction arranged perpendicular to the first direction, which is also oriented perpendicular to the insertion direction. By means of the round pin, two degrees of freedom of translation can thus be specified perpendicular to the insertion direction, while one degree of freedom of translation can be specified by means of the diamond-shaped or flat pin. Together, the two positioning elements, which are preferably arranged eccentrically, in particular relative to the fixing element and/or the counterpart fixing element, define a degree of freedom of rotation with the corresponding counterpart positioning elements. The fact that the diamond-shaped or flat pin is flattened along one direction and thus leaves a gap to an inner wall of the fitting bore in this direction helps in particular to avoid an over-determination of the relative position between the sample holder and the counterpart holder.

The diamond-shaped or flat pin also preferably has an insertion slope or a conical insertion portion in order to facilitate the insertion into the corresponding fitting bore. The fitting bore is preferably designed as a cylinder bore. In particular, the dimensions of the fitting bore for the diamond-shaped or flat pin can be identical to those of the fitting bore for the round pin. Because of the flattening along one direction, the flat pin or the diamond-shaped pin then abuts, in contrast to the round pin, only against the inner wall of the fitting bore along one direction or axis.

According to a further development of the invention, it is provided that the fixing element is designed as a draw hook and that the counterpart fixing element is designed as a latching recess. Conversely, it is also possible for the counterpart fixing element to be designed as a draw hook, with the fixing element then being designed as a latching recess. A draw hook engaging in a latching recess makes it possible for the sample holder to be quickly and easily fixed and locked in place on the counterpart holder.

The draw hook preferably has an insertion slope, particularly preferably a conical insertion portion for an easy insertion of the draw hook into the latching recess. Alternatively, or in addition, the draw hook preferably has a run-on slope, which, analogously to the way in which a wedge gear mechanism works, serves to draw the draw hook into the latching recess.

According to a further development of the invention, it is provided that the latching recess has a latching element that is pretensioned into a latching position. The run-on slope of the draw hook is preferably adapted in order to force the latching element into a release position that is counter to the pre-tension when the draw hook is inserted into the latching recess. In the latching position, when the draw hook is inserted into the latching recess, the latching element preferably engages in a latching recess of the draw hook. The run-on slope of the draw hook is preferably formed on a wall of the latching recess in such a way that the latching element runs on the run-on slope when it is shifted into the latching position due to its pre-tension and draws the draw hook into the latching recess.

In order to release the draw hook, the latching element can be displaced from the latching position into a release position, preferably against the pre-tension. The draw hook can then be removed from the latching recess.

According to a further development of the invention it is provided that the sample holder has at least one sample receptacle, preferably exactly one sample receptacle or a plurality of sample receptacles. The sample receptacle is configured to hold a sample, in particular a medical hollow body or a calibration device, or to interact with the calibration device in such a way that the calibration device can be used to calibrate the force measuring device. In particular, it is possible that the calibration device can be arranged on the sample holder in such a way that it is supported by the sample holder.

The sample holder preferably has three sample receptacles. By means of the fastening arrangement proposed here, even a plurality of samples can be arranged on the force measuring device in a reproducible and positionally accurate manner, and in particular tested simultaneously.

According to a further development of the invention, it is provided that the at least one sample receptacle is designed as a clip receptacle for a medical hollow body. This way, a medical hollow body can very easily and quickly be arranged on or in the sample receptacle, in particular, by clipping it in. Such a clip receptacle can be screwed onto a base plate of the sample holder, for example. However, another non-positive, positive and/or material connection is possible as well. The clip receptacle can also be integrally designed with the sample holder.

Alternatively, or additionally, the at least one sample receptacle is preferably designed as an abutment for a load cell. This way, a load cell can be supported on the sample holder as a calibration device. For the calibration of the force measuring device, at least one highly precise load cell, the accuracy of which is in particular higher than the accuracy of the force measuring device, is arranged on the sample holder instead of a sample. The abutment can in particular be designed as a push-on pin onto which a load cell or a plug element connected to the load cell can be plugged or pushed.

If the sample holder has a plurality of sample receptacles, these are preferably each aligned relative to one another and relative to the force measuring device, in particular arranged at the same height with one another. This way, an exact, reproducible measurement can be carried out simultaneously at all positions of the sample receptacles.

According to a further development of the invention, it is provided that a collecting reservoir for liquids is formed and/or arranged on the counterpart holder. This is particularly advantageous when testing pre-filled medical hollow bodies in order to collect liquid escaping from such a medical hollow body in the collecting reservoir during the test, in particular if errors occur or when the displacement of a piston in the medical hollow body is checked when the medical hollow body is open.

According to a development of the invention, it is provided that the counterpart holder has at least two, preferably exactly two, sample holder receptacles. This way, two different sample holders or a sample holder and a further element can be attached to the counterpart holder at the same time. The sample holder receptacles are in particular aligned relative to one another along at least one axis, in particular, in the vertical direction of the force measuring tower. The sample holder receptacles are preferably arranged offset from one another perpendicular to the vertical direction of the force measuring tower. The sample holder receptacles are particularly preferably designed to be identical to one another. This requires a particular simplicity of the fastening arrangement in production on the one hand and in operation on the other.

According to a further development of the invention, it is provided that the fastening arrangement has an abutment part which is configured to be fastened to the at least one sample holder receptacle of the counterpart holder. The abutment part is used in particular to provide support forces. It preferably has the same fastening elements as a sample holder, in particular the planar abutment surface, the at least one positioning element and the fixing element, so that it can be arranged on a sample holder receptacle instead of a sample holder.

The abutment part can in particular serve to support a sample such as a medical hollow body during the test, but it can also serve to provide an abutment for a load cell for calibration purposes.

The abutment part preferably has at least one abutment or a plurality of abutments, particularly preferably three abutments—in particular corresponding to the three sample receptacles of the sample holder.

If the abutment part is provided to support at least one sample, preferably three samples, the sample holder is preferably arranged in a first, upper sample holder receptacle of the sample holder with the abutment part being arranged in a second, lower sample holder receptacle. The pressure forces introduced into the sample for testing purposes can be supported by the abutment part.

If, on the other hand, the abutment part is intended to provide at least one abutment for a load cell, one of the two sample holder receptacles of the counterpart holder preferably remains empty with the abutment part being arranged on the other sample holder receptacle. In particular, it is possible for the abutment part to be arranged on a lower sample holder receptacle of the two sample holder receptacles while an upper sample holder receptacle remains empty.

According to a further development of the invention, it is provided that the at least one clip receptacle is injection-molded or printed. In particular, the clip receptacle can be formed as an injection-molded part, in particular as a one-component or multi-component injection-molded part. The clip receptacle can, however, can also be produced by means of a generative method, in particular a 3D printing method. The clip receptacle preferably has at least one elastic portion and/or is formed from an elastic material, in particular a plastic, so that a sample can be easily snapped into the clip receptacle. This way, the clip receptacle can be produced in a simple and inexpensive manner.

The clip receptacle preferably has at least one plastic or consists of a plastic.

Alternatively, or in addition, the sample holder is preferably formed from a metal or a metal alloy.

According to a further development of the invention, it is provided that the abutment surface is formed on an abutment plate which is attached to the sample holder. This way, the abutment surface can be manufactured particularly precisely and particularly planar, with the abutment plate being able to be arranged on the sample holder with great precision. Alternatively, or in addition, the counterpart abutment surface is preferably formed on a counterpart abutment plate which is fastened to the counterpart holder. This way, the counterpart abutment surface can be designed to be particularly flat and precise and can be fastened to the counterpart holder in a simple manner.

In particular, it is possible to manufacture an abutment plate and/or a counterpart abutment plate as precision parts. Such plates can then be screwed to the sample holder and/or the counterpart holder in a simple, quick and reproducible manner or fastened to the latter in some other way.

The object is also achieved by creating a force measuring device which has a fastening arrangement according to the invention or a fastening arrangement according to any of the embodiments described above. In connection with the force measuring device, they lead to advantages which have already been explained in the context of the fastening arrangement.

According to a further development of the invention, it is provided that the force measuring device is configured to measure tensile and/or compressive forces on medical hollow bodies. As already explained, the advantages described here are realized in a special way.

The object is also achieved by creating a sample holder which has a planar abutment surface, at least one positioning element and a fixing element. The sample holder is configured for use as a sample holder of a fastening arrangement according to the invention or as a fastening arrangement according to any of the embodiments described above. In connection with the sample holder, this leads to advantages which have already been explained in the context of the fastening arrangement.

The planar abutment surface is designed in particular to interact with a planar counterpart abutment surface of a sample holder receptacle of the fastening arrangement. The at least one positioning element is configured to interact with a counterpart positioning element of the sample holder receptacle. The fixing element is preferably configured to interact with a counterpart fixing element of the sample holder receptacle and, in particular, to hold the sample holder on the counterpart holder and to force the abutment surface and the counterpart abutment surface against one another.

In particular, the sample holder is preferably designed as explained in connection with the sample holder of the fastening arrangement according to the invention or a fastening arrangement according to one of the embodiments described above.

The object is also achieved in that a counterpart holder is created which has at least one sample holder receptacle, the sample holder receptacle having a planar counterpart surface, at least one counterpart positioning element and one counterpart fixing element. The counterpart holder is configured for use as a counterpart holder of a fastening arrangement according to the invention or a fastening arrangement according to one of the embodiments described above. In connection with the counterpart holder, this leads in particular to the advantages that have already been explained in the context of the fastening arrangement.

The planar counterpart abutment surface is designed in particular to interact with a planar abutment surface of a sample holder of the fastening arrangement. The at least one counterpart positioning element is configured in particular to interact with a positioning element of a sample holder of the fastening arrangement. The counterpart fixing element is designed, in particular, to interact with a fixing element of a sample holder of the fastening arrangement, with the fixing element and the counterpart fixing element cooperating, in particular, to hold the sample holder and the counterpart holder against one another and to force the abutment surface and the counterpart abutment surface against one another.

The counterpart holder is preferably designed as explained in connection with the counterpart holder of the fastening arrangement according to the invention or a fastening arrangement according to one of the embodiments described above.

The invention is explained in greater detail below with reference to the drawing. In the drawing.

Figure 1:
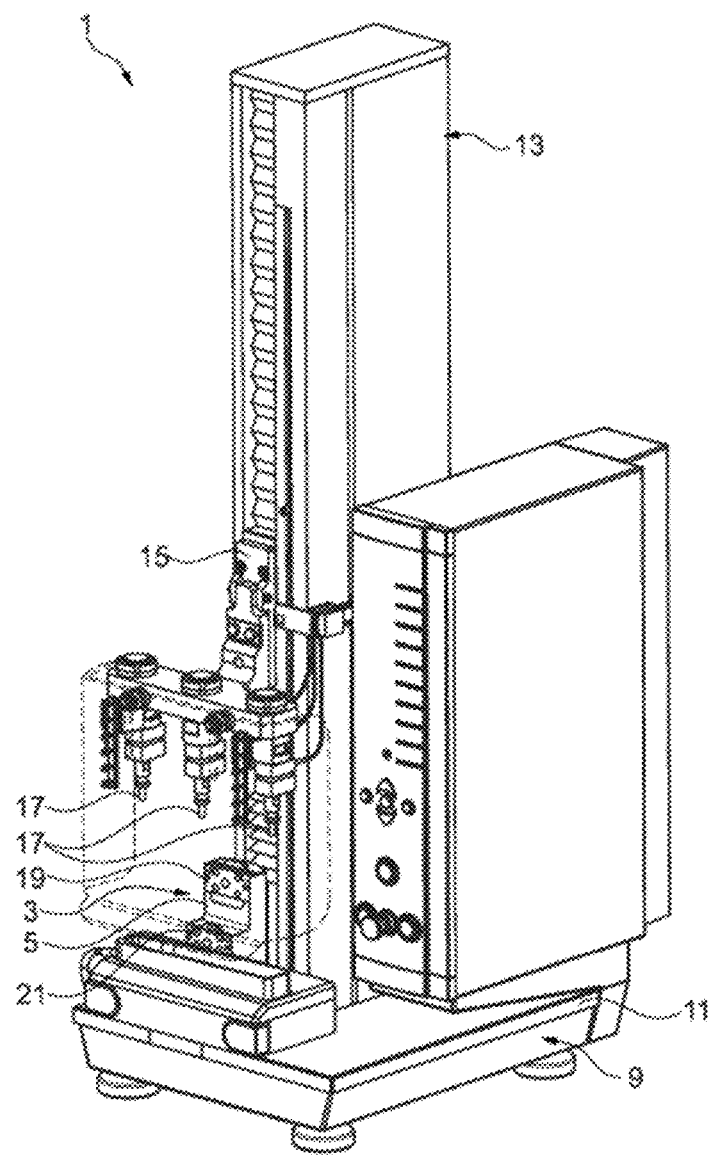
FIG. 1 is a representation of an embodiment of a force measuring device with an embodiment of a fastening arrangement.
Figure 3:
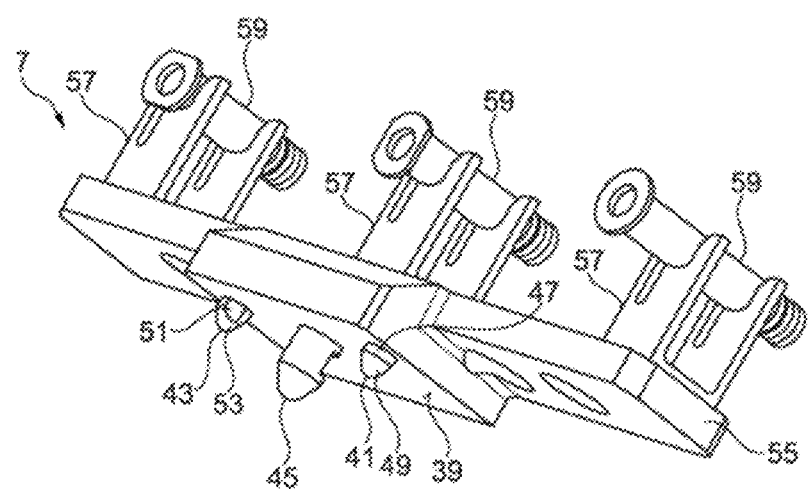
FIG. 3 is a representation of a sample holder of the fastening arrangement according to FIG. 1.

FIG. 1 is a representation of an embodiment of a force measuring device 1 which has a fastening arrangement 3, of which only one counterpart holder 5 is shown here, with the fastening arrangement 3 serving to fasten a sample holder 7 shown in FIG. 3, for example. The counterpart holder 5 is fixedly connected to a base body 9, in particular fixedly arranged on a base plate 11 of the base body 9. The counterpart holder 5 can be screwed to the base plate 11, for example.

A force measuring tower 13, on which a slide 15 is displaceably held in the vertical direction of the force measuring tower, is fixedly arranged on the base body 9 and, in particular, on the base plate 11 and, in particular, oriented in a fixed position relative to the counterpart holder 5. At least one test element, here three test elements 17, which are configured for the tensile and/or pressure testing of a sample arranged on the sample holder 7, here in particular three such samples, are connected to the slide 15. The tensile and/or pressure test is carried out in a manner that is known per se, in particular by moving the slide 15 on the force measuring tower 13 in the vertical direction.

Figure 2:
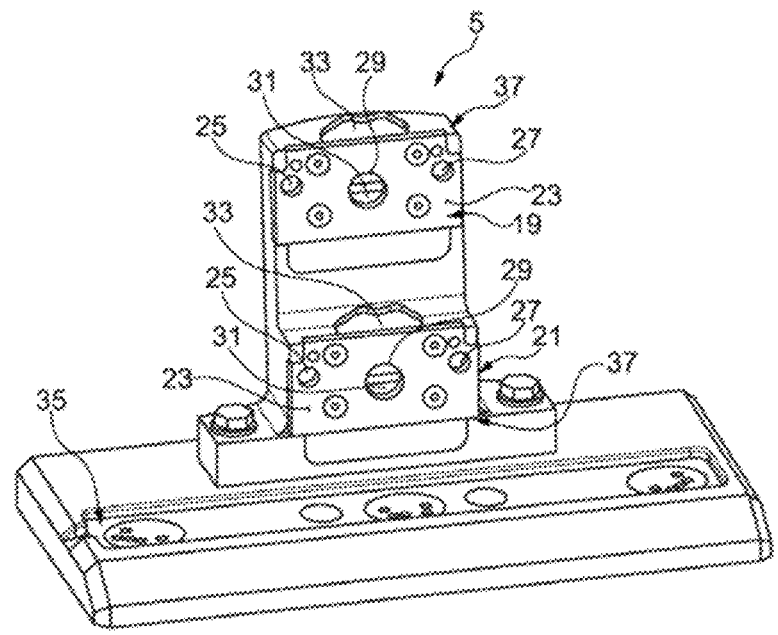
FIG. 2 is a representation of a counterpart holder of the fastening arrangement according to FIG. 1.

FIG. 2 is a detailed representation of the counterpart holder 5 of the fastening arrangement 3. The counterpart holder 5 has two sample holder receptacles, namely a first, upper sample holder receptacle 19 and a second, lower sample holder receptacle 21. The sample holder receptacles 19, 21 are thus arranged offset from one another in particular in the vertical direction. In the embodiment shown here, they are, at the same time, offset from one another perpendicular to the vertical direction. In all other aspects, the sample holder receptacles 19, 21 are preferably of identical design.

Each sample holder receptacle 19, 21 has a planar counterpart abutment surface 23 and at least one counterpart positioning element, here a first counterpart positioning element 25 and a second counterpart positioning element 27. The counterpart positioning elements 25, 27 are each designed as fitting bores.

The sample holder receptacles 19, 21 also each have a counterpart fixing element 29. In the embodiment shown here, the counterpart fixing elements 29 are designed as latching recesses. In each of the latching recesses 29, a latching element 31 that is pretensioned into a latching position as shown in FIG. 2 is arranged. This can be displaced against the pre-tension, in FIG. 2 in the downward direction, from the latching position into a release position, in particular by actuating a slider 33.

A collecting reservoir 35 for liquids is formed and/or arranged on the counterpart holder 5.

The counterpart abutment surfaces 23 are each formed on a counterpart abutment plate 37, with the counterpart abutment plates 37 being fastened to the counterpart holder 5—here by screwing.

FIG. 3 is a representation of the sample holder 7 of the fastening arrangement 3. Said sample holder is configured to be fastened, in particular fixed, to one of the sample holder receptacles 19, 21.

It has a planar abutment surface 39, which is designed to interact with the planar counterpart abutment surface 23, in particular, to come into full contact with the counterpart abutment surface 23 when the sample holder 7 is mounted on the sample holder receptacle 19, 21.

Furthermore, the sample holder 7 has at least one positioning element, here two positioning elements, namely a first positioning element 41 and a second positioning element 43. In addition, the sample holder 7 has a fixing element 45. The positioning elements 41, 43 are configured to interact with the counterpart positioning elements 25, 27 of the sample holder receptacles 19, 21. The fixing element 45 is configured to interact with the counterpart fixing element 29 of the sample holder receptacle 19, 21 in order to fix the sample holder 7 to the sample holder receptacle 19, 21.

In particular, the positioning elements 41, 43 and the counterpart positioning elements 25, 27 are configured, together with the abutment surface 39 and the counterpart abutment surface 23, to uniquely define a relative position between the sample holder 7 and the counterpart holder 5. The fixing element 45 and the counterpart fixing element 29 are designed to hold the sample holder 7 and the counterpart holder 5 against one another and to force the abutment surface 39 and the counterpart abutment surface 23 against one another.

In the embodiment shown here, the positioning elements 41, 43 are each designed as fixing pins which are configured to engage in the fitting bores of the counterpart holder 5. The first positioning element 41 is configured as a round pin and the second positioning element 43 is configured as a diamond-shaped pin. The round pin has a cylindrical shaft 47 and a conical insertion portion 49. The diamond-shaped pin has a shaft 51 which is flattened in one direction and a slanted, preferably conical or slanted insertion portion 53.

The fixing element 45 is centrally arranged on the sample holder 7. The positioning elements 41, 43 are arranged eccentrically, but preferably at the same height and in line with the fixing element 45.

The abutment surface 39 is integrally formed with a base plate 55 of the sample holder 7. Alternatively, however, it is also possible for the abutment surface 39 to be formed on an abutment plate that is then fastened to the sample holder 7, preferably screwed to the base plate 55.

The sample holder 7 has at least one sample receptacle, here three sample receptacles 57. The sample receptacles 57 are configured to receive medical hollow bodies 59, which can in particular be designed as syringes or carpules. In particular, the sample receptacles 57 are configured here as clip receptacles for the medical hollow bodies 59, wherein the medical hollow bodies 59 can simply be clipped into the clip receptacles. The sample receptacles 57 are preferably made of at least one plastic. They can be produced by injection molding, in particular plastic injection molding, or by a generative manufacturing process, in particular a 3D printing process.

Figure 4:
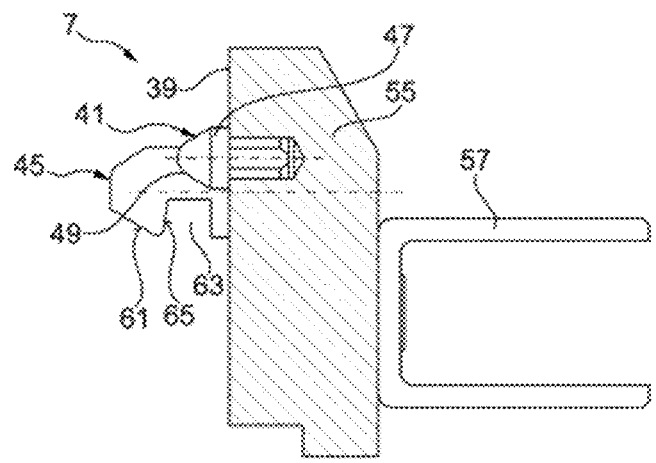
FIG. 4 is a sectional view of the sample holder according to FIG. 3.

FIG. 4 shows a sectional representation of the sample holder 7 along a cross-sectional plane at the level of the first positioning element 41, which is configured as a round pin.

Identical and functionally identical elements are generally provided with the same reference symbols, so that, in this respect, reference is made to the preceding description segments.

It is particularly clear from FIG. 4 that the fixing element 45 is configured as a draw hook. It has, in particular, an insertion slope 61, preferably as part of a conical insertion portion, with the insertion slope 61 being configured to force the latching element 31 into its release position against the pre-tension when the fixing element 55 is inserted into the latching recess of the counterpart fixing element 29. In the insertion direction behind the insertion slope, a latching recess 63 is formed on the fixing element 45, into which the latching element 31 engages after passing the insertion slope 61, being forced back into its latching position under pre-tension. The fixing element 45 has a run-on slope 65 in the latching recess 63 on a side facing the insertion slope 61, on which the latching element 31 runs when moved into its latching position, pulling the fixing element 45—in the sense of a wedge gear—further into the latching recess of the counterpart fixing element 29 and thus at the same time pulling the sample holder 7 against the counterpart holder 5. Thus, the abutment surface 39 and the counterpart abutment surface 23 are also pressed tightly against one another, preferably without any gaps and over their entire surface.

Figure 5:
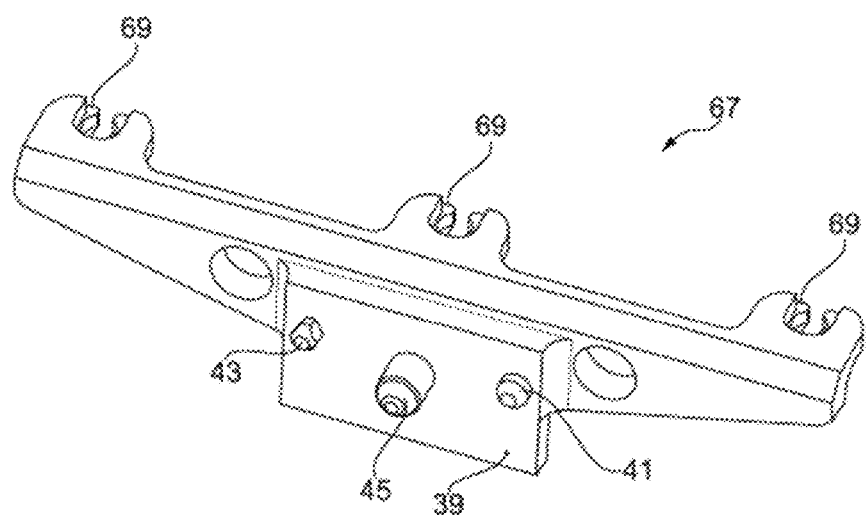
FIG. 5 is a representation of an abutment part of the fastening arrangement.

FIG. 5 shows an abutment part 67 that is configured to be fastened to one of the sample holder receptacles 19, 21 of the counterpart holder 5. The abutment part 67, just like the sample holder 7, has the planar abutment surface 39, the positioning elements 41, 43 and the fixing element 45, and is configured identically to the sample holder 7 so that reference is made to the description thereof. In particular, the abutment part 67 can, instead of a sample holder 7, be arranged on a sample holder receptacle 19, 21 of the counterpart holder 5. In order to test medical hollow bodies 59, the sample holder 7 is preferably arranged on the first, upper sample holder receptacle 19 of the counterpart holder 5, with the abutment part 67 being arranged on the second, lower sample holder receptacle 21. The abutment part 67 has abutments 69 which are configured and matched to the medical hollow bodies 59 such that they are supported in or on the abutment 69 when the force measuring device 1 measures tensile and/or compressive forces on the medical hollow bodies 59. The tensile and/or compressive forces on the medical hollow bodies 59 can thus be measured in a particularly defined and reproducible manner.

Figure 6:
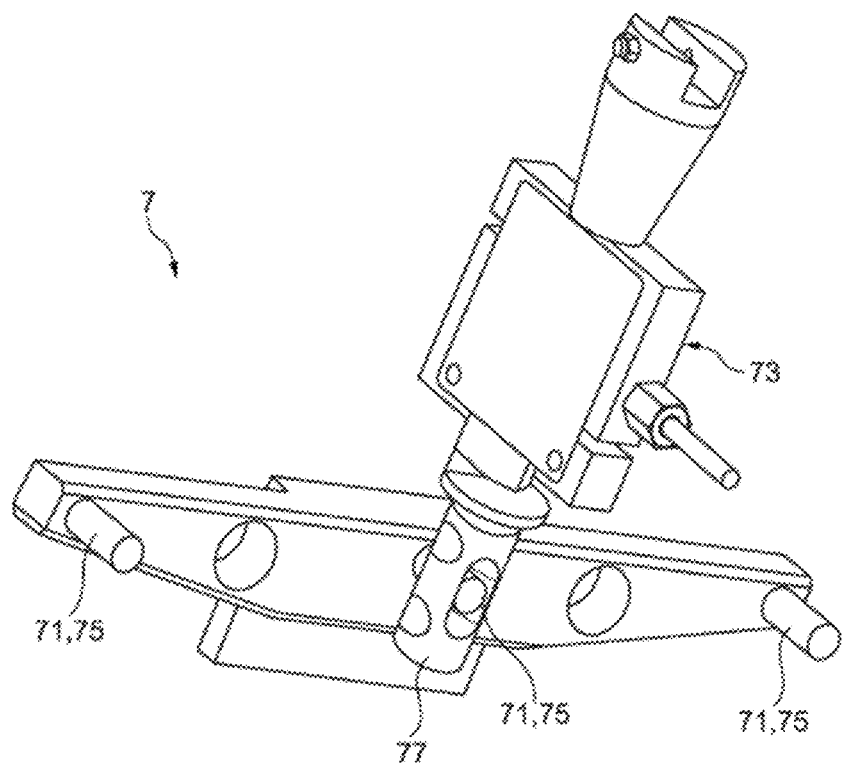
FIG. 6 is a representation of a further sample holder, designed as an abutment, of the fastening arrangement according to FIGS. 1 to 5.

FIG. 6 is a representation of another embodiment of a sample holder 7, in which the at least one sample holder is not configured as a holder for a medical hollow body 59, but rather as an abutment 71 for a load cell 73. The sample holder 7 here has three such abutments 71 for three load cells 73, although only one load cell 73 is shown for the sake of clarity. The abutments 71 for the load cells 73 are configured here as push-on pins 75. The load cells 73 can be pushed onto the push-on pins 75 with a push-on extension 77, preferably in a form-fitting manner Otherwise, in particular, with regard to the fastening of the sample holder 7 to the counterpart holder 5, the sample holder 7 shown here is identical to the previously explained sample holder 7, particularly as shown in FIGS. 3 and 4. Likewise, it can be fastened to one of the sample holder receptacles 19, 21, in particular to the second, lower sample holder receptacle 21 of the counterpart holder 5 instead of this embodiment of a sample holder 7. If the sample holder 7 shown in FIG. 6 is fastened to the counterpart holder 5, in particular to the second, lower sample holder receptacle 21, the first, upper sample holder receptacle 19 preferably remains free.

The load cells 73 that can be connected to the second embodiment of a sample holder 7 according to FIG. 6 preferably have a particularly high accuracy for a force measurement, in particular a higher accuracy than the measuring devices that are routinely used for measuring the tensile and/or compressive forces of the force measuring device 1. It is thus possible to calibrate the force measuring device 1 by means of the sample holder 7 according to FIG. 6 and the load cells 73. The load cells 73 are basically used as calibration samples in this regard.

Overall, it has been shown that the fastening arrangement 3, the sample holder 7 and the counterpart holder 5 that are proposed here allow for a highly precise, fast and reproducible fastening of samples/calibration samples/calibration devices and other devices as well as a quick exchange of the same, in particular between different types of samples.

The invention claimed is:

1. A fastening arrangement (3) for fastening a sample holder (7) to a force measuring device (1), comprising
 a sample holder (7), and
 a counterpart holder (5) on the side of the force measuring device (1), which is formed or arranged on the force measuring device (1) or is fixedly connectable to the force measuring device (1), wherein the counterpart holder (5) has at least one sample holder receptacle (19, 21), wherein
 the sample holder (7) has a planar abutment surface (39) and the sample holder receptacle (19, 21) has a planar counterpart abutment surface (23), wherein
 the sample holder (7) furthermore has at least one positioning element (41, 43) and one fixing element (45), and
 the sample holder receptacle (19, 21) has at least one counterpart positioning element (25, 27) and one counterpart fixing element (29), wherein
 the positioning element (41, 43) and the counterpart positioning element (25, 27) are configured to uniquely define a relative position between the sample holder (7) and the counterpart holder (5) together with the abutment surface (39) and the counterpart abutment surface (23), and wherein
 the fixing element (45) and the counterpart fixing element (29) are configured to hold the sample holder (7) and the counterpart holder (5) against one another and to force the abutment surface (39) and the counterpart abutment surface (23) against one another, characterized in that one element selected from the fixing element (45) and the counterpart fixing element (29) is configured as a draw hook, with the other element, which is selected from the counterpart fixing element (29) and the fixing element (45), is designed as a latching recess.

2. The fastening arrangement (3) according to claim 1, characterized in that at least one element selected from the at least one positioning element (41, 43) and the at least one counterpart positioning element (25, 27) is configured as a fitting pin, wherein the other element, which is selected from the at least one counterpart positioning element (25, 27) and the at least one positioning element (41, 43), is configured as a fitting bore.

3. The fastening arrangement (3) according to claim 1, characterized in that the sample holder (7) has a first positioning element (41) and a second positioning element (43) as the at least one positioning element, wherein the counterpart holder (5) as the at least one counterpart positioning element has a first counterpart positioning element (25) and a second counterpart positioning element (27), wherein
  a) the first positioning element (41) is configured as a round pin, the second positioning element (43) as a diamond-shaped pin or flat pin, the first counterpart positioning element (25) as a fitting hole, and the second counterpart positioning element (27) as a fitting hole, or
  b) the first positioning element (41) is configured as a round pin, the second positioning element (43) as a fitting bore, the first counterpart positioning element (25) as a fitting bore, and the second counterpart positioning element (27) as a diamond-shaped pin or flat pin, or
  c) the first positioning element (41) is configured as a fitting bore, the second positioning element (43) as a diamond-shaped pin or flat pin, the first counterpart positioning element (25) as a round pin, and the second counterpart positioning element (27) as a fitting bore, or
  d) the first positioning element (41) is configured as a fitting bore, the second positioning element (43) as a fitting bore, the first counterpart positioning element (25) as a round pin, and the second counterpart positioning element (27) as a diamond-shaped pin or flat pin.

4. The fastening arrangement (3) according to claim 1, characterized in that the latching recess has a latching element (31) that is pretensioned into a latching position.

5. The fastening arrangement (3) according to claim 1, characterized in that the sample holder (7) has at least one sample receptacle (57), preferably three sample receptacles (57).

6. The fastening arrangement (3) according to claim 5, characterized in that the at least one sample receptacle (57) is configured as
  (a) a clip receptacle for a medical hollow body (59), or
  (b) an abutment (71) for a load cell (73).

7. The fastening arrangement (3) according to claim 1, characterized in that a collecting reservoir (35) for liquids is formed and/or arranged on the counterpart holder (5).

8. The fastening arrangement (3) according to claim 1, characterized in that the counterpart holder (5) has two sample holder receptacles (19, 21) as the at least one sample holder receptacle (19, 21).

9. The fastening arrangement (3) according to claim 1, characterized in that the fastening arrangement (3) has an abutment part (67) which is configured to be fastened to the at least one sample holder receptacle (19, 21) of the counterpart holder (5).

10. The fastening arrangement (3) according to claim 1, characterized in that the at least one sample receptacle (57) of the sample holder (7) that is configured as a clip receptacle is manufactured by injection molding or by a generative manufacturing process, in particular a 3D printing process.

11. The fastening arrangement (3) according to claim 1, characterized in that the abutment surface (39) is formed on an abutment plate which is fastened to the sample holder (7), and/or that the counterpart abutment surface (23) is formed on a counterpart abutment plate (37), which is fastened to the counterpart holder (5).

12. A force measuring device (1), comprising:
  a sample holder (7), and
  a counterpart holder (5), wherein the counterpart holder (5) has at least one sample holder receptacle (19, 21), wherein
  the sample holder (7) has a planar abutment surface (39) and the sample holder receptacle (19, 21) has a planar counterpart abutment surface (23), wherein
  the sample holder (7) furthermore has at least one positioning element (41, 43) and one fixing element (45), and
  the sample holder receptacle (19, 21) has at least one counterpart positioning element (25, 27) and one counterpart fixing element (29), wherein
  the positioning element (41, 43) and the counterpart positioning element (25, 27) are configured to uniquely define a relative position between the sample holder (7) and the counterpart holder (5) together with the abutment surface (39) and the counterpart abutment surface (23), and wherein
  the fixing element (45) and the counterpart fixing element (29) are configured to hold the sample holder (7) and the counterpart holder (5) against one another and to force the abutment surface (39) and the counterpart abutment surface (23) against one another, characterized in that one element selected from the fixing element (45) and the counterpart fixing element (29) is configured as a draw hook, with the other element, which is selected from the counterpart fixing element (29) and the fixing element (45), is designed as a latching recess.

13. The force measuring device (1) according to claim 12, configured to measure tensile and/or compressive forces on medical hollow bodies (59).

14. A counterpart holder (5) comprising, with at least one sample holder receptacle (19, 21), the sample holder receptacle (19, 21) having a planar counterpart abutment surface (23), at least one counterpart positioning element (25, 27) and a counterpart fixing element (29), and wherein the counterpart holder (5) is configured for use as a counterpart holder (5) of a fastening arrangement (3); and
  a sample holder (7), having a planar abutment surface (39), at least one positioning element (41, 43) and a fixing element (45), the sample holder (7) being configured for use as the sample holder (7) of the fastening arrangement (3),
  characterized in that one element selected from the fixing element (45) and the counterpart fixing element (29) is configured as a draw hook, with the other element, which is selected from the counterpart fixing element (29) and the fixing element (45), is designed as a latching recess; and further characterized in that a collecting reservoir (35) for liquids is formed and/or arranged on the counterpart holder.

\* \* \* \* \*